US008614744B2

(12) United States Patent
Brown et al.

(10) Patent No.: US 8,614,744 B2
(45) Date of Patent: Dec. 24, 2013

(54) AREA MONITORING USING PROTOTYPICAL TRACKS

(75) Inventors: Lisa M. Brown, Pleasantville, NY (US); Arun Hampapur, Norwalk, CT (US); Andrew W. Senior, New York, NY (US); Chiao-Fe Shu, Scarsdale, NY (US); Ying-li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1305 days.

(21) Appl. No.: 12/176,538

(22) Filed: Jul. 21, 2008

(65) Prior Publication Data

US 2010/0013656 A1 Jan. 21, 2010

(51) Int. Cl.

| | |
|---|---|
| ***H04N 7/18*** | (2006.01) |
| ***G08B 13/00*** | (2006.01) |
| ***G06K 9/00*** | (2006.01) |
| ***G01C 23/00*** | (2006.01) |

(52) U.S. Cl.
USPC ................ 348/143; 340/565; 382/103; 701/3

(58) Field of Classification Search
USPC .......................................................... 348/143
See application file for complete search history.

(56) References Cited

U.S. PATENT DOCUMENTS

| | | | | |
|---|---|---|---|---|
| 5,966,074 | A * | 10/1999 | Baxter | 340/565 |
| 6,535,114 | B1 | 3/2003 | Suzuki et al. | |
| 7,355,508 | B2 | 4/2008 | Mian et al. | |
| 7,480,414 | B2 | 1/2009 | Brown et al. | |
| 7,796,154 | B2 | 9/2010 | Senior et al. | |
| 2003/0053659 | A1 * | 3/2003 | Pavlidis et al. | 382/103 |
| 2004/0113933 | A1 | 6/2004 | Guler | |
| 2005/0001759 | A1 | 1/2005 | Khosla | |
| 2005/0018045 | A1 | 1/2005 | Thomas et al. | |
| 2008/0004756 | A1 * | 1/2008 | Hedrick | 701/3 |

OTHER PUBLICATIONS

Chris Stauffer, "Estimating Tracking Sources and Sinks", Proceedings of the Second IEEE Workshop on Event Mining, Jul. 17, 2003 (pp. 1-8).

* cited by examiner

*Primary Examiner* — Christopher S Kelley
*Assistant Examiner* — Hee-Yong Kim
(74) *Attorney, Agent, or Firm* — Matthew Chung; Hoffman Warnick LLC

(57) ABSTRACT

A solution for monitoring an area includes using a region schema for the area. The region schema can include a set of prototypical tracks, each of which includes a start location, an end location, and a trajectory. The trajectory comprises an expected path an object will travel between the start location and the end location and can include variation information that defines an amount that an object can vary from the trajectory. The region schema can be generated by obtaining training object tracking data for the area for an initialization time period and evaluating the object tracking data to identify the set of prototypical tracks. While monitoring the area, monitored object tracking data is obtained for a monitored object in the area, and abnormal behavior of the monitored object is identified when the monitored object tracking data for the monitored object does not follow at least one of the set of prototypical tracks in the region schema.

16 Claims, 13 Drawing Sheets

50B

42B

50A

42A

70

72

AREA MONITORING USING PROTOTYPICAL TRACKS

TECHNICAL FIELD

The disclosure relates generally to video-based monitoring, and more particularly, to incorporating context information for a region while performing video-based monitoring.

BACKGROUND ART

In a surveillance system, a camera will image a particular region. Each region has a particular context. By understanding the context, an operator can understand the activities that are occurring there and determine whether an activity is important or not. As a result, a human monitoring video of a region can effectively classify events as being of significance or not. However, such manual monitoring can be extremely tedious, with long stretches of insignificant and/or no activity. As a result, an individual will tend to become inattentive, thereby reducing his/her effectiveness at manually monitoring region(s).

Current automated/semi-automated surveillance solutions attempt to automatically detect and report significant events. In general, a significant event is detected based on motion of an object within the region. Common image-based triggers for the event include motion within a restricted area, occurrence of an event at a particular time, motion that is too fast/slow, and/or the like. Further, an image-based trigger may be based on one or more attributes of the object, such as, for example, the presence of an unauthorized individual. However, to date, these surveillance solutions are susceptible to false alarms.

SUMMARY OF THE INVENTION

Aspects of the invention provide a solution for monitoring an area that includes using a region schema for the area. The region schema can include a set of prototypical tracks, each of which includes a start location, an end location, and a trajectory. The trajectory comprises an expected path an object will travel between the start location and the end location and can include variation information that defines an amount that an object can vary from the trajectory. The region schema can be generated by obtaining training object tracking data for the area for an initialization time period and evaluating the object tracking data to identify the set of prototypical tracks. While monitoring the area, monitored object tracking data is obtained for a monitored object in the area, and abnormal behavior of the monitored object is identified when the monitored object tracking data for the monitored object does not follow at least one of the set of prototypical tracks in the region schema. By using the region schema, a number of errors made by an automated/semi-automated surveillance system can be reduced.

A first aspect of the invention provides a method of monitoring an area, the method comprising: generating a region schema for the area, the generating including: obtaining training object tracking data for the area for an initialization time period; evaluating the object tracking data to identify a set of prototypical tracks, each prototypical track including a start location, an end location, and a trajectory, the trajectory comprising an expected path an object will travel between the start location and the end location; and storing the set of prototypical tracks in the region schema; obtaining monitored object tracking data for a monitored object in the area after the initialization time period; and identifying abnormal behavior of the monitored object when the monitored object tracking data for the monitored object does not follow at least one of the set of prototypical tracks in the region schema.

A second aspect of the invention provides a system for monitoring an area, the system comprising: a component configured to obtain a region schema for the area, the region schema including a set of prototypical tracks, each prototypical track including a start location, an end location, and a trajectory, the trajectory comprising an expected path an object will travel between the start location and the end location; a component configured to obtain monitored object tracking data for a monitored object in the area; and a component configured to identify abnormal behavior of the monitored object when the monitored object tracking data for the monitored object does not follow at least one of the set of prototypical tracks in the region schema.

A third aspect of the invention provides a computer program comprising program code embodied in at least one computer-readable medium, which when executed, enables a computer system to implement a method, the method comprising: generating a region schema for an area, the generating including: obtaining training object tracking data for the area for an initialization time period; evaluating the object tracking data to identify a set of prototypical tracks, each prototypical track including a start location, an end location, and a trajectory, the trajectory comprising an expected path an object will travel between the start location and the end location; and storing the set of prototypical tracks in the region schema; and storing the region schema on a computer-readable medium.

A fourth aspect of the invention provides a method of generating a system for monitoring an area, the method comprising providing a computer system operable to: generate a region schema for the area, the generating including: obtaining training object tracking data for the area for an initialization time period; evaluating the object tracking data to identify a set of prototypical tracks, each prototypical track including a start location, an end location, and a trajectory, the trajectory comprising an expected path an object will travel between the start location and the end location; and storing the set of prototypical tracks in the region schema; obtain monitored object tracking data for a monitored object in the area after the initialization time period; and identify abnormal behavior of the monitored object when the monitored object tracking data for the monitored object does not follow at least one of the set of prototypical tracks in the region schema.

A fifth aspect of the invention provides a method comprising: at least one of providing or receiving a copy of a computer program that is embodied in a set of data signals, wherein the computer program enables a computer system to implement a method of monitoring an area, the method comprising: generating a region schema for the area, the generating including: obtaining training object tracking data for the area for an initialization time period; evaluating the object tracking data to identify a set of prototypical tracks, each prototypical track including a start location, an end location, and a trajectory, the trajectory comprising an expected path an object will travel between the start location and the end location; and storing the set of prototypical tracks in the region schema; obtaining monitored object tracking data for a monitored object in the area after the initialization time period; and identifying abnormal behavior of the monitored object when the monitored object tracking data for the monitored object does not follow at least one of the set of prototypical tracks in the region schema.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for monitoring an area that includes using a region schema for the area. The region schema can include a set of prototypical tracks, each of which includes a start location, an end location, and a trajectory. The trajectory comprises an expected path an object will travel between the start location and the end location and can include variation information that defines an amount that an object can vary from the trajectory. The region schema can be generated by obtaining training object tracking data for the area for an initialization time period and evaluating the object tracking data to identify the set of prototypical tracks. While monitoring the area, monitored object tracking data is obtained for a monitored object in the area, and abnormal behavior of the monitored object is identified when the monitored object tracking data for the monitored object does not follow at least one of the set of prototypical tracks in the region schema. As used herein, unless otherwise noted, the term "set" means one or more (i.e., at least one) and the phrase "any solution" means any now known or later developed solution.

Figure 1:
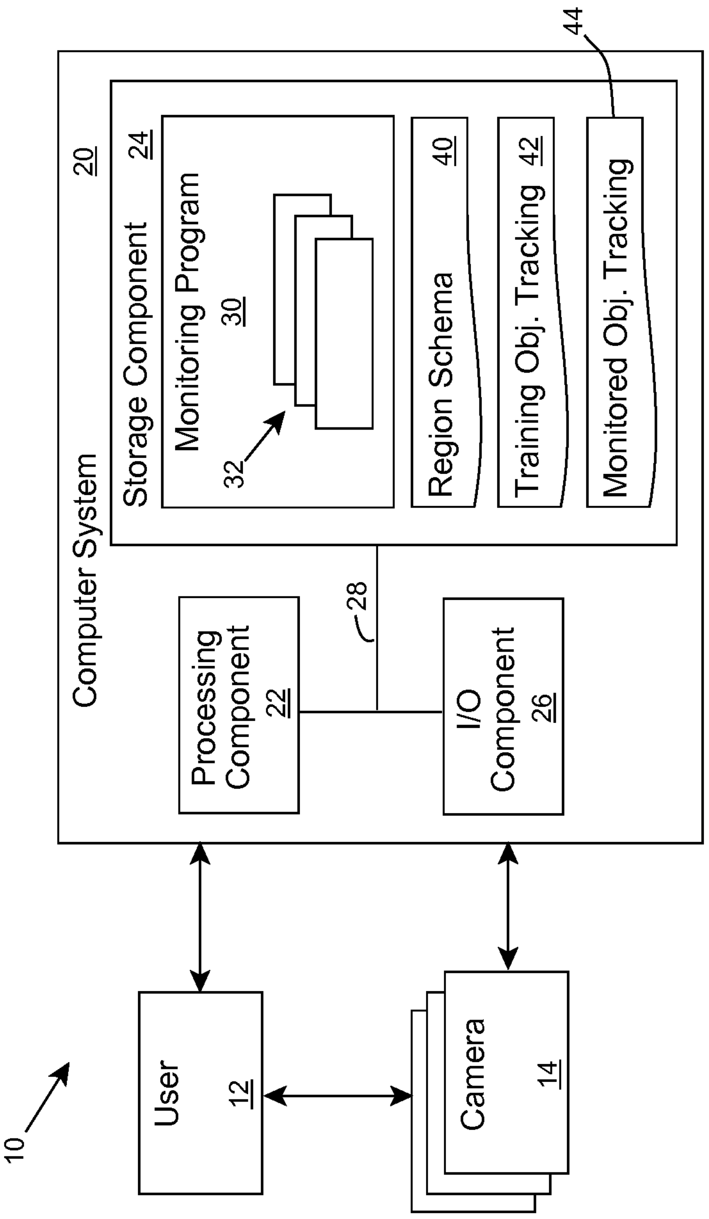
FIG. 1 shows an illustrative environment for monitoring an area according to an embodiment.

Turning to the drawings, FIG. 1 shows an illustrative environment 10 for monitoring an area according to an embodiment. To this extent, environment 10 includes a computer system 20 that can perform the process described herein in order to monitor the area. In particular, computer system 20 is shown including a monitoring program 30, which makes computer system 20 operable to monitor the area by performing the process described herein. It is understood that the monitored area can comprise a single continuous physical location or multiple physical locations, at least some of which may be physically disjointed from the other physical locations.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as monitoring program 30, which is at least partially embodied in storage component 24. While executing program code, processing component 22 can process data, which can result in reading and/or writing the data to/from storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, monitoring program 30 can manage a set of interfaces (e.g., graphical user interface(s), application program interface, and/or the like) that enable human and/or system users 12 to interact with monitoring program 30. Further, monitoring program 30 can manage (e.g., store, retrieve, create, manipulate, organize, present, etc.) the data, such as region schema 40, training object tracking data 42, and monitored object tracking data 44, using any solution.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, monitoring program 30 can be embodied as any combination of system software and/or application software.

Further, monitoring program 30 can be implemented using a set of modules 32. In this case, a module 32 can enable computer system 20 to perform a set of tasks used by monitoring program 30, and can be separately developed and/or implemented apart from other portions of monitoring program 30. As used herein, the term "component" means any configuration of hardware, with or without software, which implements and/or enables a computer system 20 to implement the functionality described in conjunction therewith using any solution, while the term "module" means program code that enables a computer system 20 to implement the functionality described in conjunction therewith using any solution. When embodied in a tangible medium of expression, a module is a component. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of monitoring program 30 embodied thereon (e.g., one or more modules 32). However, it is understood that computer system 20 and monitoring program 30 are only representative of various possible equivalent computer systems that may perform a process described herein. To this extent, in other embodiments, the functionality described herein as being implemented by computer system 20 and monitoring program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, monitoring program 30 enables computer system 20 to monitor an area. To this extent, computer system 20 obtains video from a set of cameras 14 using any solution. It is understood that the term "video" includes any series of images captured (e.g., periodically) by a single camera 14. To this extent, the camera can capture multiple images every second, an image every few seconds, and/or the like. Computer system 20 can render the images from one or more of the cameras 14 on a monitor for viewing by user 12. Further, user 12 can selectively move one or more of the cameras 14 using computer system 20 and/or an interface device for the camera(s) 14.

Each camera 14 acquires images for a particular region. When multiple cameras 14 are included, the cameras 14 will typically acquire data for multiple, distinct regions. Further, when a camera 14 is movable (e.g., pan, tilt, zoom), the region that is imaged by the camera 14 may change. It is understood that a region imaged by a camera 14 may be physically disjointed from the other regions, may be included within another region, and/or may partially overlap another region imaged by other camera(s) 14 in environment 10.

Computer system 20 monitors the area by analyzing the video received from camera(s) 14 using region schema 40. Region schema 40 includes various data that computer system 20 can utilize to reduce false alarms and/or generate more meaningful alarms, which can occur during the analysis. The data can include data on the region being imaged (e.g., background of image) as well as data on the moving objects that are found within the region being imaged. Based on an analysis of the background image data and/or moving object image data, computer system 20 can store semantic labels and/or descriptors of the region within region schema 40. For example, region schema 40 can include a semantic label for any entry/exit points for moving objects (e.g., due to a door, occluding corner of a building, road/path meeting the edge of the imaged area, etc.). Similarly, based on the attributes of moving objects traveling along a particular area, region schema 40 can include data on a path, which could be labeled as a road, a pedestrian walkway, etc. Further, region schema 40 can include semantic labels that correspond to fixed objects/areas, such as a parking spot, a building, a tree, etc.

Figure 2:
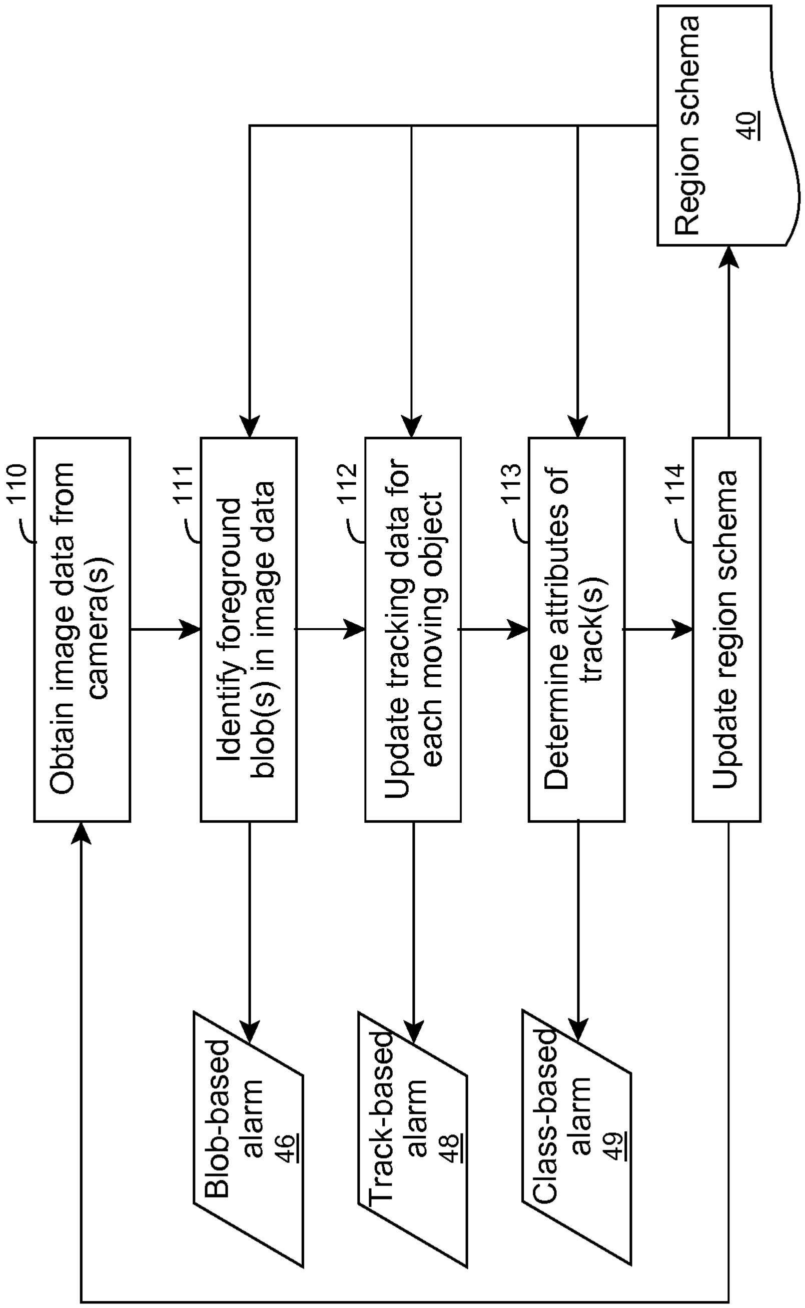
FIG. 2 shows an illustrative process for monitoring an area using a region schema according to an embodiment.

FIG. 2 shows an illustrative process for monitoring an area using region schema 40, which can be implemented by computer system 20, according to an embodiment. In process 110, computer system 20 receives image data from camera(s) 14 using any solution. In process 111, computer system 20 identifies zero or more foreground blobs in the image data using any solution, e.g., background subtraction and/or connected component analysis. In process 112, computer system 20 updates tracking data for each moving object, if any, currently being imaged by camera(s) 14 using any solution. For example, computer system 20 can match a set of blobs in a current frame with information on a tracked object from a previous frame, and update the information for the tracked object based on the blob(s). In process 113, computer system 20 determines one or more attributes of the track(s) using any solution. Computer system 20 can determine various attributes for a track, including, for example, start time, entry point, speed, direction, object color, object size, and/or the like.

In each analysis performed by computer system 20, computer system 20 may generate one or more alarms due to one or more detected abnormalities. Computer system 20 can use region schema 40 to reduce false alarms, generate more accurate alarms, and/or improve overall functionality at each stage of the analysis. For example, in process 111, computer system 20 may generate a blob-based alarm 46, e.g., due to an unexpectedly large/small blob, blob in an unexpected location, etc. Computer system 20 can use region schema 40 to address common sources of false blob-based alarms 46 and/or improve moving object detection, such as perform shadow removal (e.g., using static object information together with time of day and viewing direction information), blob removal due to movement of a static object, such as branches on a tree, ripples/reflection on a body of water, utilize statistics regarding where objects appear in a scene to ignore one or more blobs, and/or the like.

Similarly, in process 112, computer system 20 may generate a track-based alarm 48, e.g., due to an unexpected termination, location, direction, etc., of a track, while in process 113, computer system 20 can generate one or more classification-based alarms 49, e.g., due to one or more attributes of a track falling outside an expected classification. Computer system 20 can reference empirical data about the location and the corresponding moving objects stored in region schema 40 to improve the tracking and/or classification, and the corresponding accuracy of track-based and/or classification-based alarm(s) 48. For example, computer system 20 can use statistics regarding expected entry/exit locations for objects, expected object size and/or speed for certain tracks, expected paths for objects between entry/exit locations and typical attributes of the paths, traffic pattern statistics, and/or the like, which can be stored in region schema 40. To this extent, computer system 20 can learn that cars travel only along a set of paths, which can be stored in region schema 40. Subsequently, computer system 20 can use this knowledge to improve object classification.

In process 114, computer system 20 can update region schema 40 based on the results of processing new image data for the location. For example, region schema 40 can be updated to accommodate seasonal changes, time of day changes, and/or the like, which may occur relatively slowly over a period of time. Similarly, a user 12 can provide feedback on any alarms that computer system 20 generates. The feedback can indicate when an alarm was a false-positive, and computer system 20 can update region schema 40 with information on the false-positive alarm to improve later alarm generation (e.g., suppress similar false-positive alarms).

In any event, when a camera 14 is first deployed to a location, computer system 20 can generate region schema 40 for the area being monitored based on image data acquired by camera 14. Region schema 40 can comprise various information regarding the area. For example, region schema 40 can comprise data on events that normally occur in the monitored area. As used herein, an "event" can comprise any change in the area being monitored. Illustrative events include, for example, object(s) moving within the area, lighting changes, shadow movement, and/or the like.

In order to generate region schema 40, computer system 20 can process image data received from camera 14 during an initialization time period and automatically extract some or all of the information in region schema 40 from the image data. The initialization time period can comprise any amount of time, which can vary based on an implementation of computer system 20. For example, when used to monitor a parking area of an office building, the initialization time period can comprise one week since each day of a week may have slightly different normal events. However, when implemented to monitor airplane activity at a busy airport, the initialization time period may be only a few hours since the activity may be repetitive and continuous. Further, it is understood that the initialization time period can be configured based on the types and/or frequencies of normal and/or anomalous events that are anticipated for the area.

Figure 3:
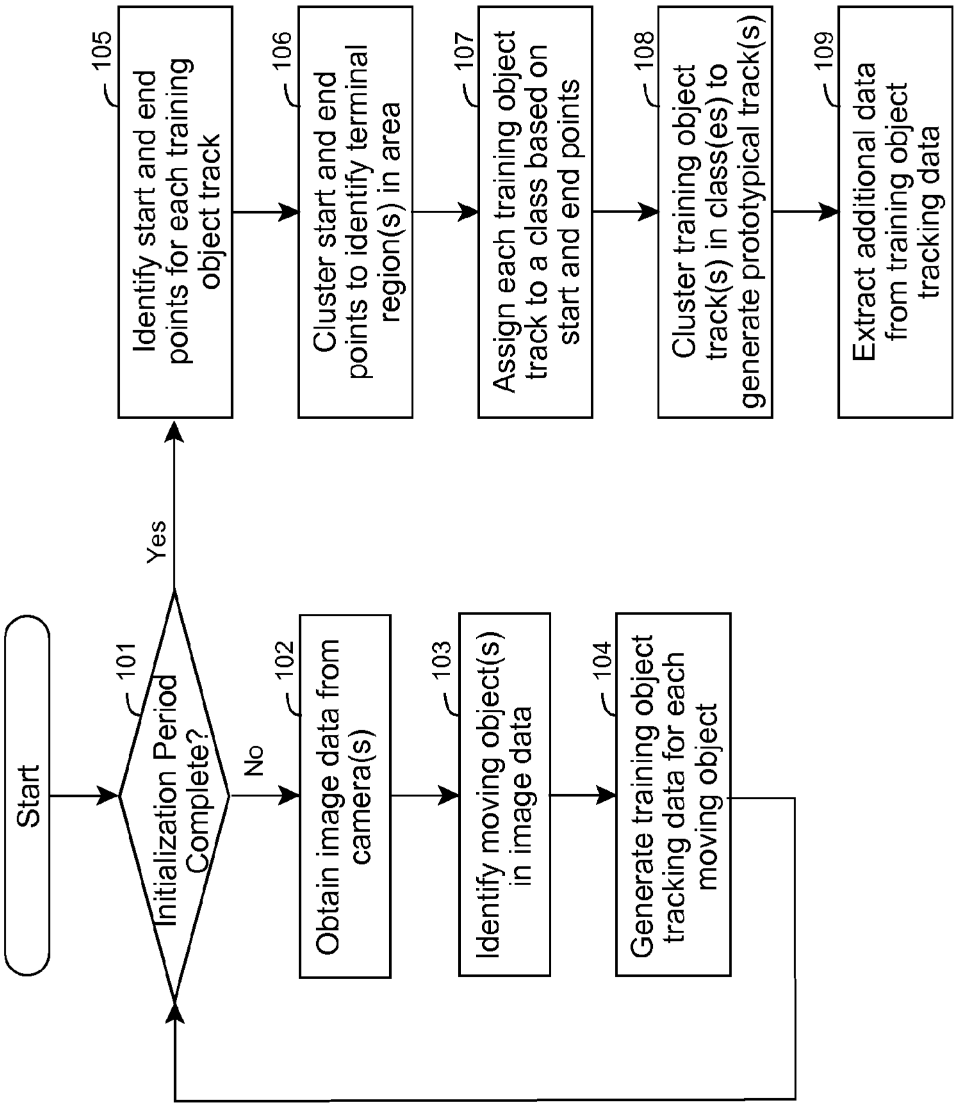
FIG. 3 shows an illustrative process for generating a region schema according to an embodiment.

In any event, FIG. 3 shows an illustrative process for generating region schema 40, which can be implemented by computer system 20, according to an embodiment. Referring to FIGS. 1 and 3, in process 101, computer system 20 can determine whether the initialization period is complete. If not, then in process 102, computer system 20 can obtain image data (e.g., video) from camera(s) 14 using any solution. In process 103, computer system 20 can identify any moving objects that may be present within the imaged area using any solution. For example, computer system 20 can perform background subtraction to obtain a set of blobs and perform connected component analysis on the blobs to identify the locations of moving objects within the imaged area.

Over a series of images, the location of a moving object will change within the area. To this extent, in process 104, computer system 20 can generate training object tracking data 42 for each moving object based on the blob(s) using any solution. Once complete for a moving object, the training object tracking data 42 can include, for example, a timestamp for when the moving object appears within the area, a timestamp for when the moving object leaves the area, a start point in which the moving object appears, an end point in which the moving object leaves, a size of the moving object, a color of the moving object, and/or the like. Further, training object tracking data 42 can include a training object track, which comprises a track of the movement of the object within the area between the start and end points.

Regardless, during the initialization time period, computer system 20 can generate and store training object tracking data 42 for moving objects as they enter and leave the area. Once in process 101, computer system 20 determines that the initialization time period is complete, training object tracking data 42 will include object tracking data for multiple moving objects within the area. Computer system 20 can use training object tracking data 42 to generate region schema 40.

In an embodiment, region schema 40 includes a set of prototypical tracks for the monitored area. Each prototypical track can include a start location, an end location, and a trajectory that comprises an expected path that an object will travel between the start and end locations. Frequently, the start and end locations will include locations that are adjacent to the edge of the area being imaged by camera 14 and be in locations that are frequently traveled by moving objects (e.g., a path, a road, and/or the like). Further, other illustrative types of start and end locations that may be present within the center portion of the imaged area comprise: an entrance to a building; an edge of a building or other structure, which may block an appearance of an object within a portion of the imaged area; a location within the area at which individuals frequently exit/enter vehicles (e.g., a bus stop); and/or the like.

Rather than require a user to manually identify all of the regions and trajectories, computer system 20 can evaluate training object tracking data 42 to identify one or more of the prototypical tracks. For example, in process 105, computer system 20 can identify a start point and an end point for each training object track in training object tracking data 42 using any solution. In an embodiment, the start and end point are stored in training object tracking data 42. Alternatively, computer system 20 can analyze an object track and determine the start and end points (which may or may not be distinguishable).

In process 106, computer system 20 can cluster the start and end points to identify a set of terminal regions in the monitored area. Depending on an implementation, each terminal region may act as both a start and an end location, or may exclusively act as a start or an end location. In an embodiment, computer system 20 can cluster all of the start and end points to identify each terminal region. Subsequently, when it is desirable to distinguish between a start terminal region and an end terminal region, computer system 20 can evaluate all the points within the identified terminal region(s) to determine whether it is a start location, an end location, or both. Alternatively, computer system 20 can separately cluster the start and end locations to separately identify start and end terminal regions. Subsequently, computer system 20 can separately store and utilize the start and end terminal regions, or evaluate the start and end terminal regions for overlap, and merge start and end terminal regions that include sufficient overlap into a single start/end terminal region. When two terminal regions only partially overlap, computer system 20 can merge the separate start terminal region and end terminal region into two or three regions: a start/end terminal region, which includes the overlapping portion of both regions and one or both of a start and end terminal region, each of which comprises a region that was exclusively the corresponding type of terminal region.

In process 107, computer system 20 can assign each training object track to one of a plurality of classes based on the start and end points. In general, computer system 20 can manage a set of classes, each of which includes all training object tracks having start and end points in the same terminal regions. In an embodiment, computer system 20 assigns training object tracks that have a start point in terminal region A and an end point in terminal region B to a different class than training object tracks that have a start point in terminal region B and an end point in terminal region A. Alternatively, these training object tracks can be assigned to the same class since each training object track has one start/end point in each terminal region A and B. Further, computer system 20 can manage an anomaly class, and assign all training object tracks that do not have a start and/or an end point in any of the terminal regions to this class. The training object tracks in the anomaly class can be discarded, or computer system 20 can provide them to a user 12 for further (e.g., manual) evaluation.

In process 108, computer system 20 can cluster the training object track(s) in each of the plurality of classes, other than the anomaly class, to generate a prototypical track for the corresponding class, which computer system 20 can store in region schema 40. In an embodiment, the prototypical track includes a start location, an end location, and a trajectory that comprises a path that an object is expected to travel between the start location and the end location. For example, computer system 20 can calculate an average start location, end location, and trajectory based on a combination of all of the training object tracks assigned to a particular class. It is understood that when the start and end locations are not required to be distinguished, all of the start and all of the end locations can correspond to one of the two terminal regions, regardless of where a particular object track actually began and ended.

Further, computer system 20 can determine variation information for the start location, end location, and/or trajectory, which can be stored as part of the prototypical track. For example, computer system 20 can calculate a series of standard deviations from the average start location, end location, and trajectory of the prototypical track. The series of standard deviations can be calculated for both the start and end locations, and for one or more locations that are periodically located along the trajectory. The series of standard deviations can define a corresponding series of crossbars, each of which intersects the trajectory in the location corresponding to one of the standard deviations. Alternatively, computer system 20 can define a two-dimensional region that corresponds to the prototypical track based on the trajectory and the series of standard deviations. In any event, computer system 20 can determine that an object that starts and ends within the standard deviation of a prototypical path and moves along the trajectory within the standard deviations (e.g., passes through each crossbar, the two-dimensional region, and/or the like) followed the prototypical path, which computer system 20 can classify as a normal event.

Additionally, the variation information can include an indication of a set of typical modes of variation from the trajectory of the prototypical track. To this extent, computer system 20 can determine the set of typical modes of variation based on principal components of the cluster of training object tracks for the class, which computer system 20 can store in region schema 40 using any solution. The typical modes of variation can comprise changes in velocity, changes in size, changes in the direction of movement, and/or the like. In any event, computer system 20 can use the set of typical modes of variation to further analyze an object track to determine whether it is a normal event or an abnormal event. When computer system 20 determines that a trajectory includes variation outside of the typical modes, computer system 20 can identify the trajectory as an abnormal event (e.g., too great a change in size or velocity, too many changes in direction, and/or the like).

Computer system 20 also can store time information for the prototypical track. For example, computer system 20 can calculate an average amount of time and standard deviation for objects to travel along the trajectory for the prototypical track. In this case, in addition to remaining physically close to the trajectory, an object will also need to travel at a speed that is sufficiently close to the average speed for the prototypical track (e.g., not too fast and not too slow).

In process 109, computer system 20 can extract additional data from training object tracking data 42, which computer system 20 can store as part of region schema 40. For example, computer system 20 can extract the times that various events and/or subsets of events (e.g., object tracks assigned to a class) occur. Further, computer system 20 can store the number of these events that occurred within a particular group of time periods as part of region schema 40. Further, computer system 20 can acquire other information from one or more additional sources, which can be stored in region schema 40. For example, computer system 20 can store calibration information, such as time of day, longitude/latitude, global positioning system data, and/or the like. Additionally, computer system 20 can extract higher level data from training object tracking data 42, such as statistics regarding the likelihood of a pixel belonging to a foreground object, statistics regarding entry/exit locations, normative trajectories and their attributes (e.g., speed, size, class/type of object, color, etc.), and/or the like.

Once computer system 20 has obtained region schema 40 for the area to be monitored, computer system 20 can begin monitoring the area using the region schema 40. In particular, computer system 20 can obtain monitored object tracking data 44 for a monitored object in the area using any solution. For example, computer system 20 can receive image data from camera 14 and generate the monitored object tracking data 44 in substantially the same manner as discussed herein with respect to the training object tracking data 42.

Computer system 20 can use the region schema 40 and monitored object tracking data 44 to identify abnormal behavior of a monitored object. For example, when a monitored object does not follow any of the prototypical tracks, computer system 20 can identify the object track for the monitored object as abnormal behavior. To this extent, computer system 20 can compare the monitored object tracking data 44 for the monitored object to the set of prototypical tracks in the region schema 40. When the monitored object tracking data 44 does not match at least one of the set of prototypical tracks, computer system 20 can identify the monitored object tracking data 44 as abnormal behavior.

As discussed herein, each prototypical track can include variation information for the start location, end location, and/or trajectory. In this case, the monitored object tracking data 44 only needs to remain within an area of the prototypical track that is defined by the variation information. When the monitored object tracking data 44 varies too far from each prototypical track, computer system 20 can identify the monitored object tracking data 44 as abnormal behavior. For example the variation information can comprise a set of crossbars periodically located along the trajectory of a prototypical track, and the monitored object trajectory must pass through each of the set of crossbars for computer system 20 to evaluate the trajectory as being normal. Conversely, when the monitored object tracking data 44 does not pass through each crossbar for any of the prototypical tracks, computer system 20 can identify the monitored object tracking data 44 as abnormal behavior. Similarly, when the variation information defines a set of typical modes of variation from a trajectory of a prototypical track, the monitored object must vary from the trajectory in one of the set of typical modes of variation in order for computer system 20 to identify the monitored object tracking data 44 as following the prototypical track.

In addition to considering the start location, end location, and/or trajectory of a monitored object, computer system 20 can consider additional attributes of the behavior of the monitored object to identify abnormal behavior. For example, the direction of the motion can indicate abnormal behavior (e.g., traveling wrong way down a one way street), an amount of time that the object remains in the monitored area can indicate abnormal behavior (e.g., traveling too fast/slow), a time of day and/or day of the week that an object appears can indicate abnormal behavior, a size or one or more other attributes of the moving object can indicate abnormal behavior (e.g., large object moving in unusual location), and/or the like.

Regardless, when computer system 20 identifies abnormal behavior of a monitored object, computer system 20 can generate an alert for presentation to a user 12 in response to the abnormal behavior. The alert can comprise any type of alert, including a message, a graphical alert, an audio alert, and/or the like. Further, computer system 20 can store the monitored object tracking data 44 for each monitored object for later reference by user 12 and/or evaluation of computer system 20. In an embodiment, computer system 20 can separately store monitored object tracking data 44 being flagged as abnormal for future reference by user 12 and/or archival.

Figure 4:
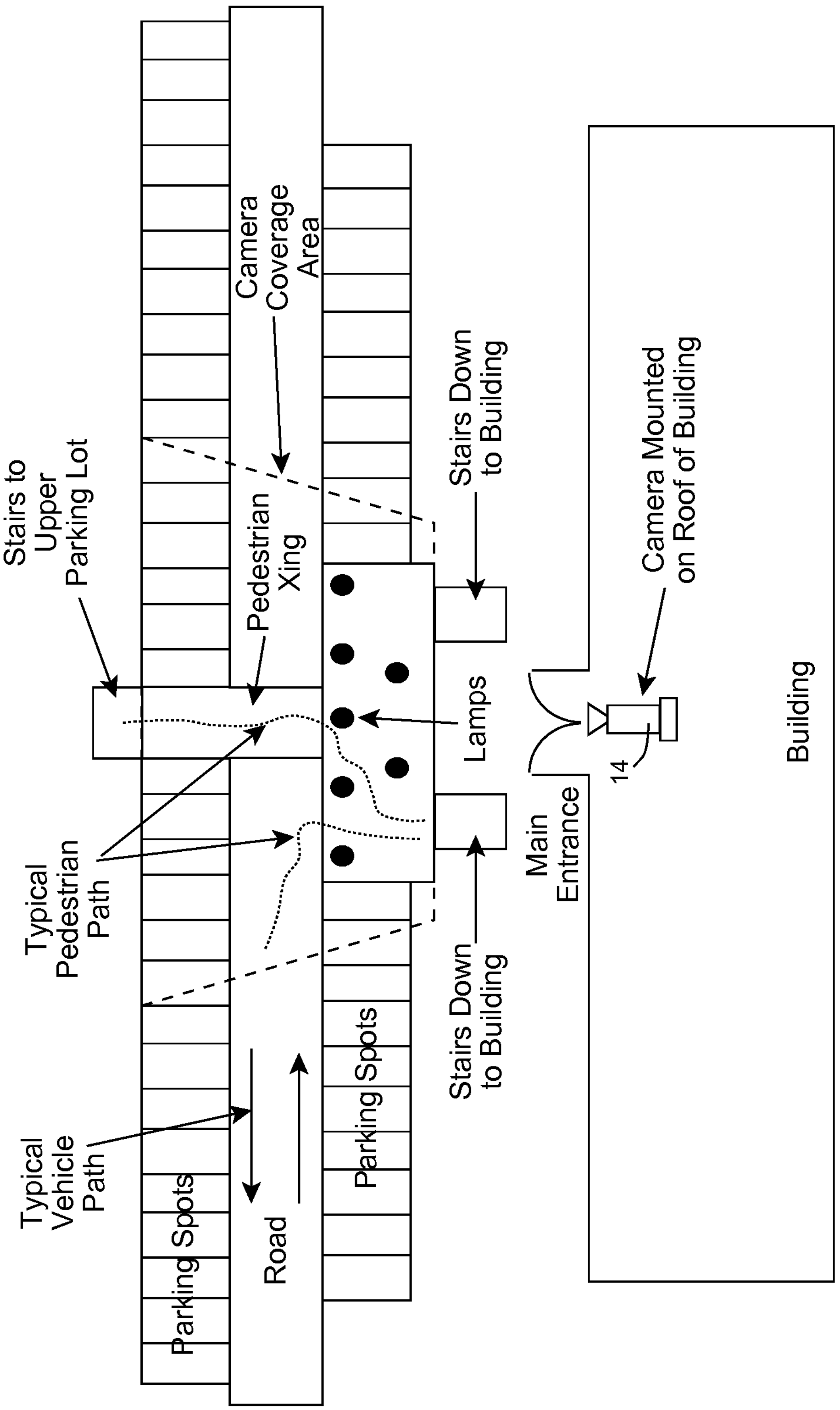
FIG. 4 shows an illustrative application for monitoring an area using the computer system of FIG. 1 according to an embodiment.

Aspects of the invention are further described with reference to an illustrative application. FIG. 4 shows an illustrative application for monitoring an area using computer system 20 (FIG. 1) according to an embodiment. In this embodiment, a single camera 14 is mounted on the roof of a building and acquires image data for an area that is directly in front of the main entrance to the building. The imaged area primarily includes a pedestrian crossing and a road, and also includes some parking spots in which vehicles may be parked. At a bottom of the imaged area, there is a sidewalk, which has a set of stairs on each side to access/depart from the main entrance. To this extent, people will typically enter into or exit from the imaged area in locations corresponding to the stairs. Two illustrative pedestrian paths are shown.

Figure 5B:
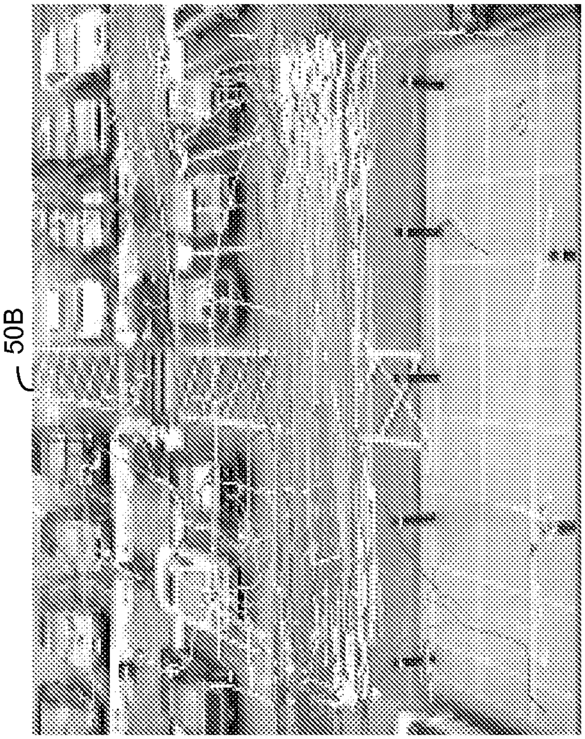
FIGS. 5A-B show illustrative images of the monitored area of FIG. 4 with training object tracking data displayed thereon according to an embodiment.
Figure 5A:
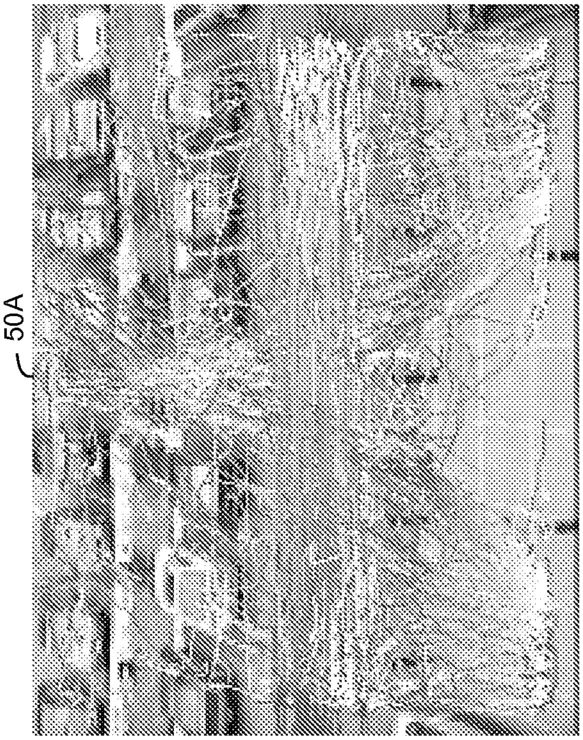

FIGS. 5A-B show illustrative images 50A-B, respectively, of the monitored area of FIG. 4 with training object tracking data 42A-B (e.g., object trajectories) respectively displayed thereon according to an embodiment. In FIGS. 5A-B, a start point of each object trajectory is indicated by a light portion of the trajectory, and an end point of each object trajectory is indicated by a dark portion of the trajectory. Computer system 20 generates the training object tracking data 42A-B for an initialization period. In this case, computer system 20 recorded the trajectories over a period of twenty-four hours. FIG. 5A shows all object trajectories that were generated during the initialization time period, while FIG. 5B only shows object trajectories that were generated for objects having a minimum size during for the initialization time period. As illustrated in FIG. 5A, most object trajectories are likely attributed to vehicles traveling along the road and individuals walking along the pedestrian crossing and sidewalk between their parked vehicles and the building. As would be expected based on the geography of the area, individuals primarily walked to/from the lower right or lower left side of the sidewalk. As shown in FIG. 5B, most tracked objects of the minimum size were likely vehicles traveling along the road and vehicles entering/exiting parking spots that are visible within the field of view. A few of the larger objects have tracks located on the sidewalk, which could be attributable to a group of people being tracked as a single object, an individual transporting a larger object (e.g., a backpack, package(s)), or the like.

Figure 6A:
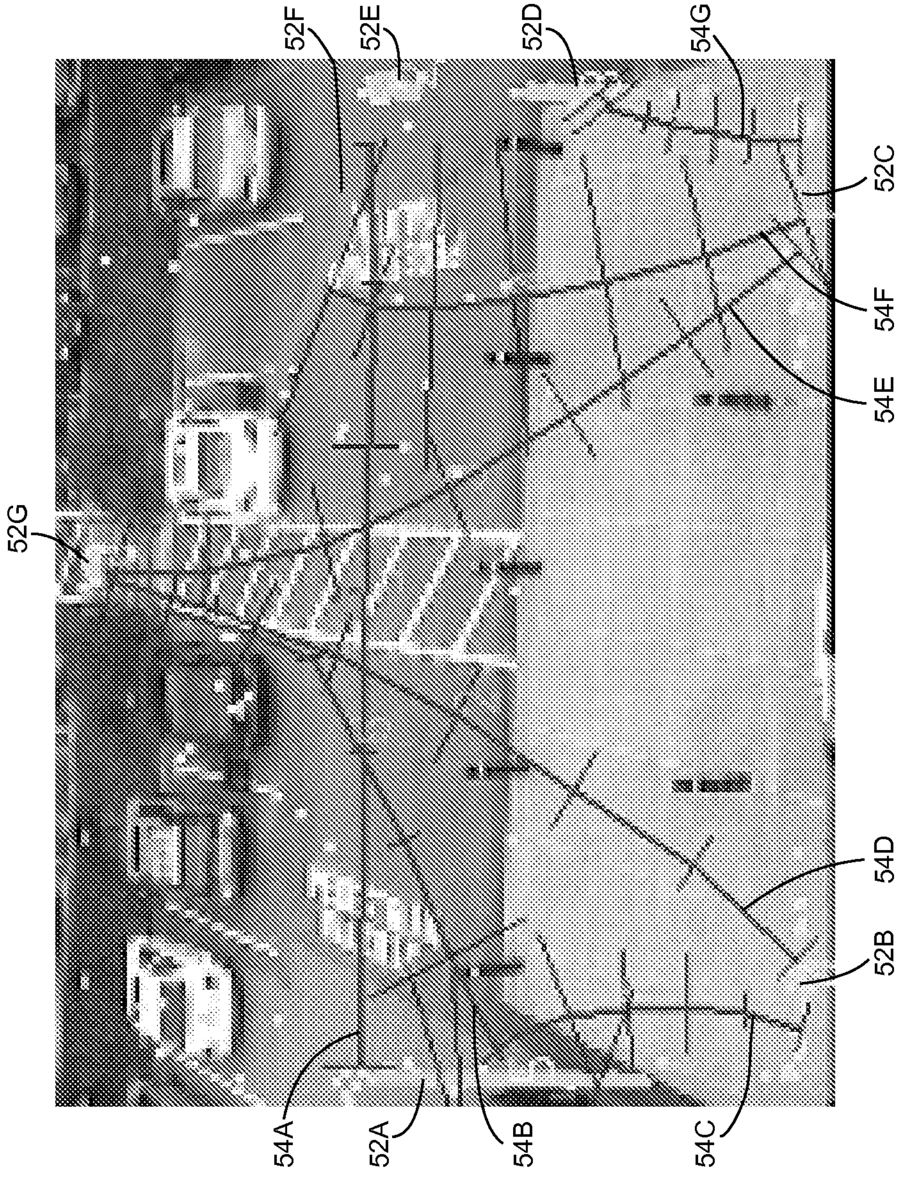
FIGS. 6A-C show illustrative data that can be extracted from the training object tracking data shown in FIGS. 5A-B according to an embodiment.
Figure 6B:
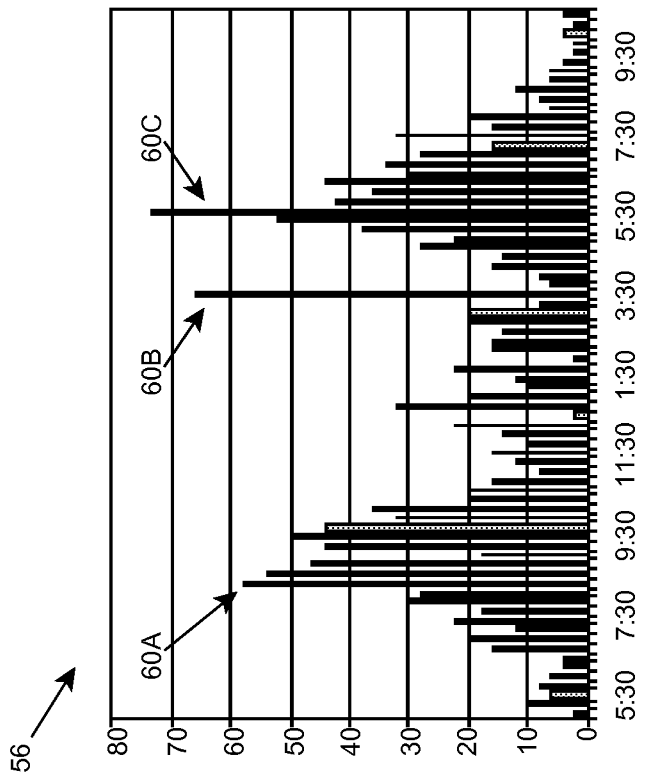
Figure 6C:
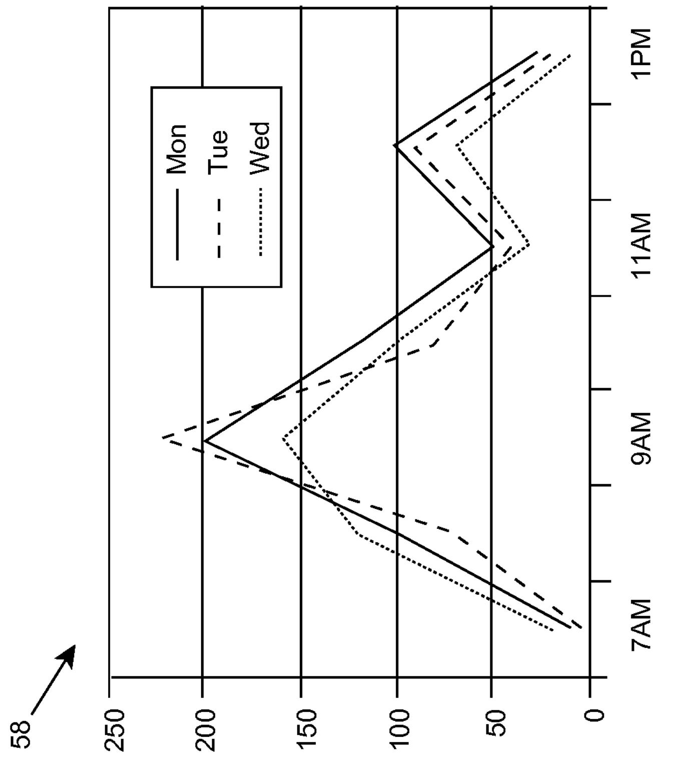

Computer system 20 processes training object tracking data 42 to generate region schema 40. To this extent, FIGS. 6A-C show illustrative data that computer system 20 can extract from the training object tracking data 42A-B shown in FIGS. 5A-B and store in region schema 40 according to an embodiment. In FIG. 6A, a set of terminal regions 52A-G and a set of prototypical tracks 54A-G are shown. As described herein, computer system 20 can cluster the start and end points of the training object track in training object tracking data 42A-B to identify each terminal region 52A-G. Subsequently, computer system 20 can assign each training object track to a class based on its start and end points, and cluster the training object tracks in each class (except for an abnormal class) to generate the prototypical tracks 54A-G. As illustrated, each prototypical track 54A-G includes variation information, which comprises a set of crossbars periodically located along the trajectory of each prototypical track 54A-G, each of which represents a normal range of variation that an object may deviate from the trajectory of the corresponding prototypical track 54A-G. Terminal region 52F likely corresponds to a region in which individuals frequently are dropped off/exit parked cars within the field of view.

In addition to the object trajectories shown in FIGS. 5A-B, training object tracking data 42 can include additional information, such as a size of an object, a speed of an object, a time that the track started, a time that the track ended, etc. Computer system 20 can generate various reports using various formats for presentation of the information to a user 12. To this extent, FIG. 6B shows an illustrative histogram 56 of the number of events (e.g., arriving and departing individuals) that occurred within the monitored area during various time periods according to an embodiment. As illustrated, the events have three peaks 60A-C, at approximately 8:30 am, 3:30 pm, and 5:30 pm, respectively. Similarly, FIG. 6C shows an illustrative line graph 58 showing the number of events that occurred for time periods during the same six hours for three days.

Figure 7:
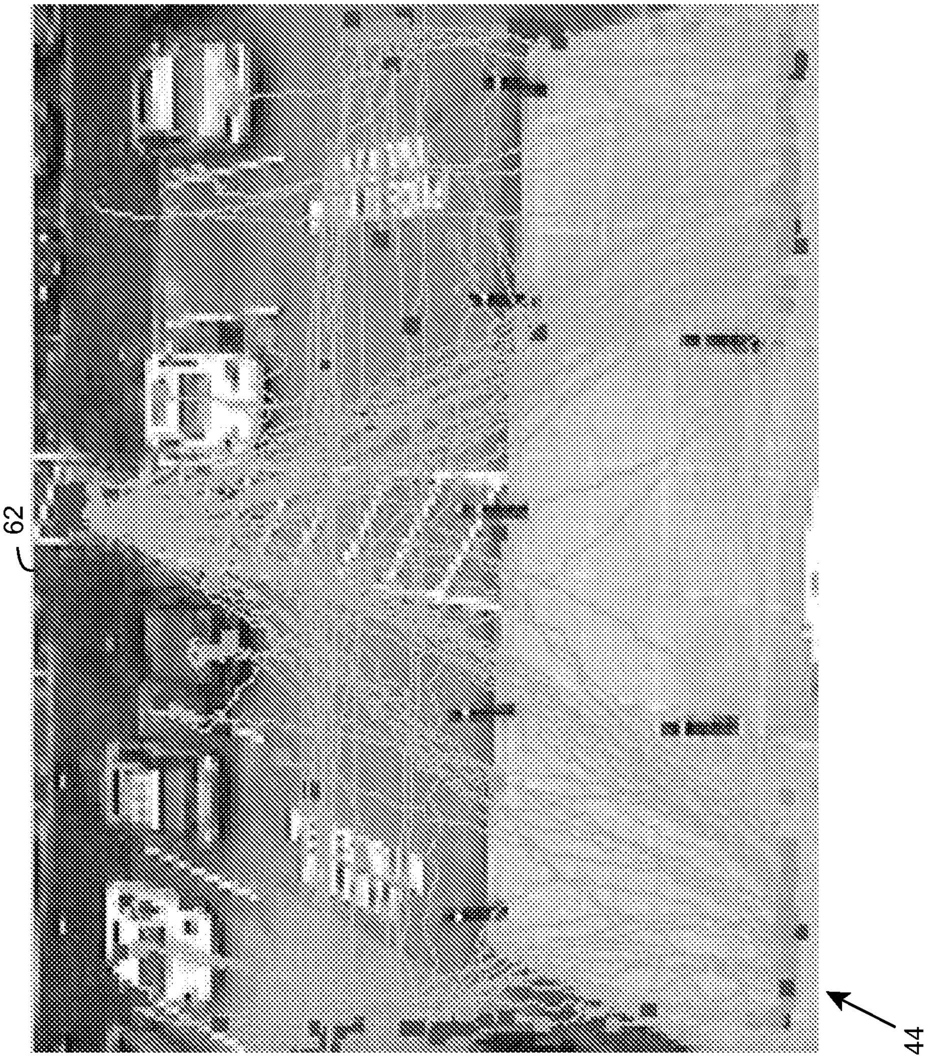
FIG. 7 shows an illustrative image of the monitored area of FIG. 4 with monitored object tracking data displayed thereon according to an embodiment.

In any event, computer system 20 can use region schema 40 to determine when an object exhibits abnormal behavior. To this extent, FIG. 7 shows an illustrative image 62 of the monitored area of FIG. 4 with monitored object tracking data 44 displayed thereon according to an embodiment. Monitored object tracking data 44 was obtained by computer system 20 for a one hour period, and included a total of 132 monitored object tracks. In an embodiment, computer system 20 can evaluate the tracking data for each of the monitored object tracks and determine whether it follows at least one of the prototypical tracks in region schema 40. If not, the monitored object track can be identified as abnormal behavior, and computer system 20 can generate an alert for presentation to user 12 in response to the abnormal behavior. For example, computer system 20 can display the monitored object track on a monitor and an indication of why the monitored object track is considered abnormal.

Figure 8:
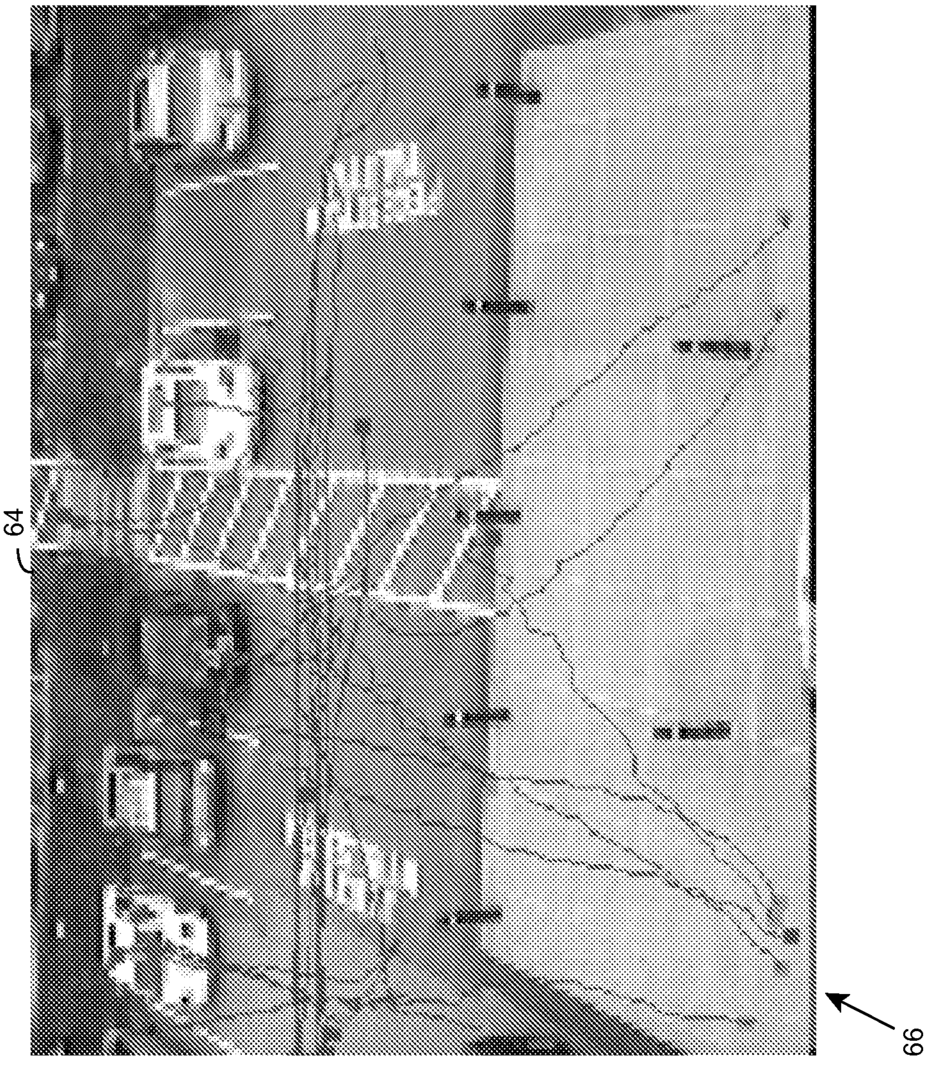
FIG. 8 shows an illustrative image of the monitored area of FIG. 4 with monitored object tracking data that has been evaluated as abnormal behavior displayed thereon according to an embodiment.

FIG. 8 shows an illustrative image 64 of the monitored area of FIG. 4 with monitored object tracking data 66 that has been evaluated as abnormal behavior displayed thereon according to an embodiment. As can be seen, most of the abnormal behavior is likely due to vehicles pulling in and out of the parking spots that are visible within the image 64 and the people exiting and entering these vehicles. In these cases, objects frequently do not enter and/or exit in one of the terminal locations 52A-G (FIG. 6A), and therefore often do not follow one of the prototypical tracks 54A-G (FIG. 6A). When monitoring an entrance as in this implementation, it may be desirable that computer system 20 identify to user 12 (e.g., a security individual) every time vehicles are entering/departing these parking spots as they are the closest to the entrance.

However, to address these activities, or other activities that occur relatively infrequently but are still normal, in an automated manner, user 12 can manually generate one or more additional prototypical tracks, which can be stored in region schema 40. For example, user 12 could identify object tracking data 66 that has been evaluated as abnormal and request that computer system 20 add a prototypical track to region schema 40 that corresponds to the object tracking data 66. In an embodiment, computer system 20 can apply a default set of variation information to the prototypical track. Further, computer system 20 can enable user 12 to adjust the variation information (e.g., the length of each crossbar) for the prototypical track using any solution.

Figure 9A:
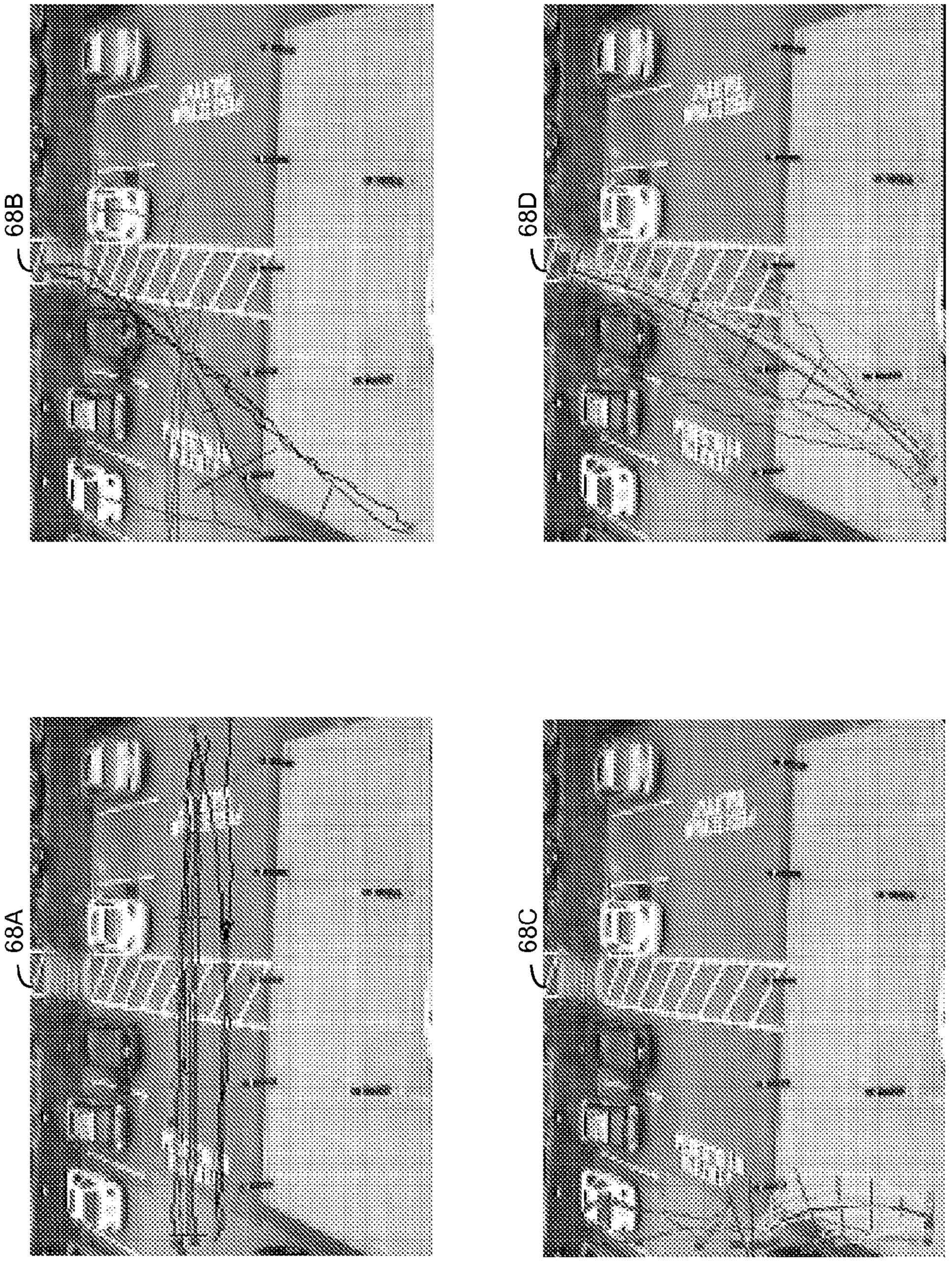
FIGS. 9A-B show illustrative images of the monitored area of FIG. 4 with monitored object tracking data and the corresponding prototypical tracks that were used to evaluate the monitored object tracking data displayed thereon according to an embodiment.
Figure 9B:
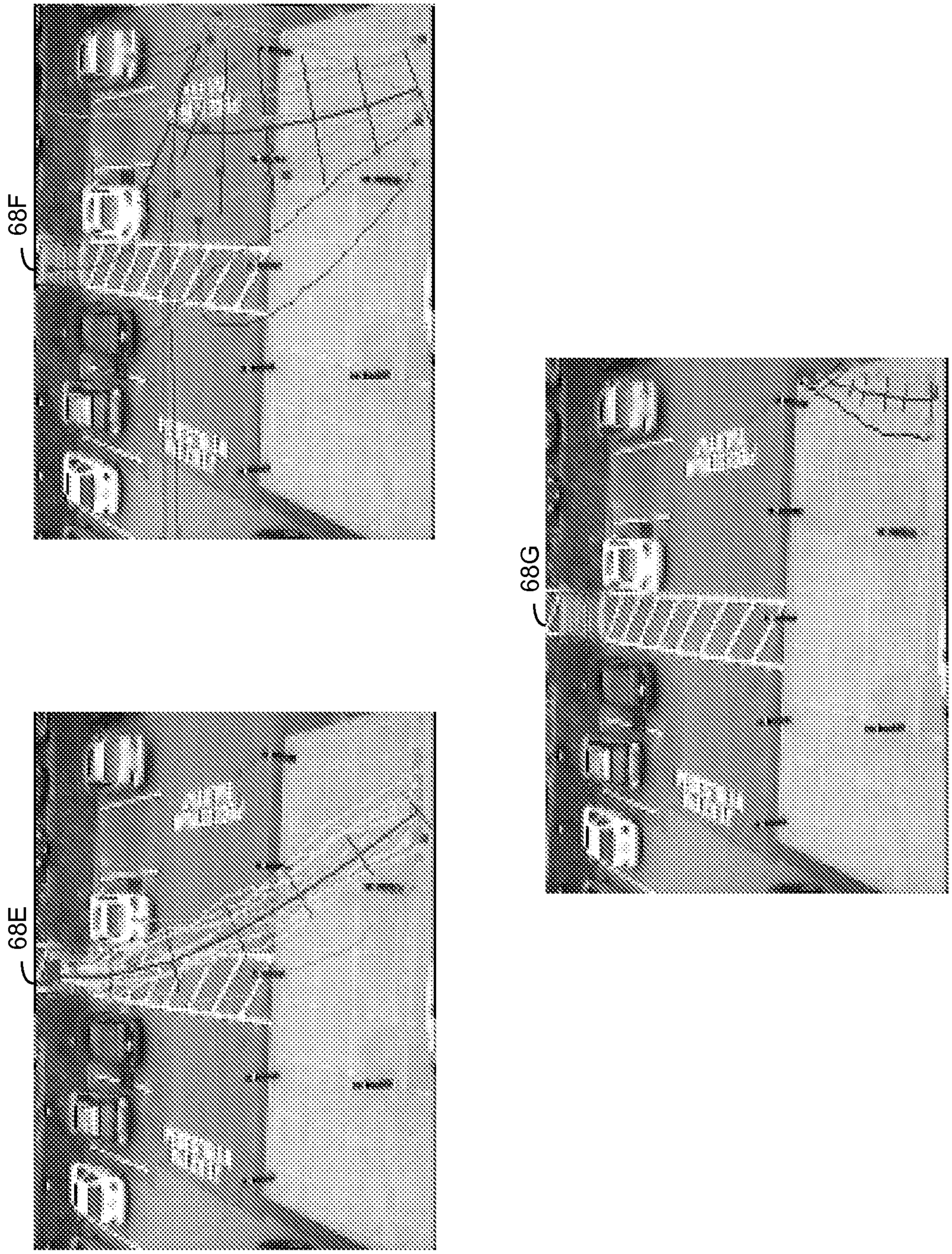

FIGS. 9A-B show illustrative images 68A-G of the monitored area of FIG. 4 with monitored object tracking data and the corresponding prototypical tracks 54A-G (FIG. 6A), respectively, which were used to evaluate the monitored object tracking data displayed thereon according to an embodiment. In images 68A-G, monitored object tracking data that was evaluated as abnormal behavior are shown in a common color (e.g., red), while object tracking data that sufficiently matched the corresponding prototypical track 54A-G are shown in various other colors, which can be used to indicate a degree with which the object tracking data matched the corresponding prototypical track 54A-G and/or the prototypical track 54A-G with which the object tracking data was matched. Computer system 20 can generate and present images 68A-G for use by user 12 in evaluating the performance of computer system 20 and the accuracy of prototypical tracks 54A-G. To this extent, computer system 20 can enable user 12 to make manual refinements to the locations and/or variance information for the prototypical tracks 54A-G using any solution.

Figure 10:
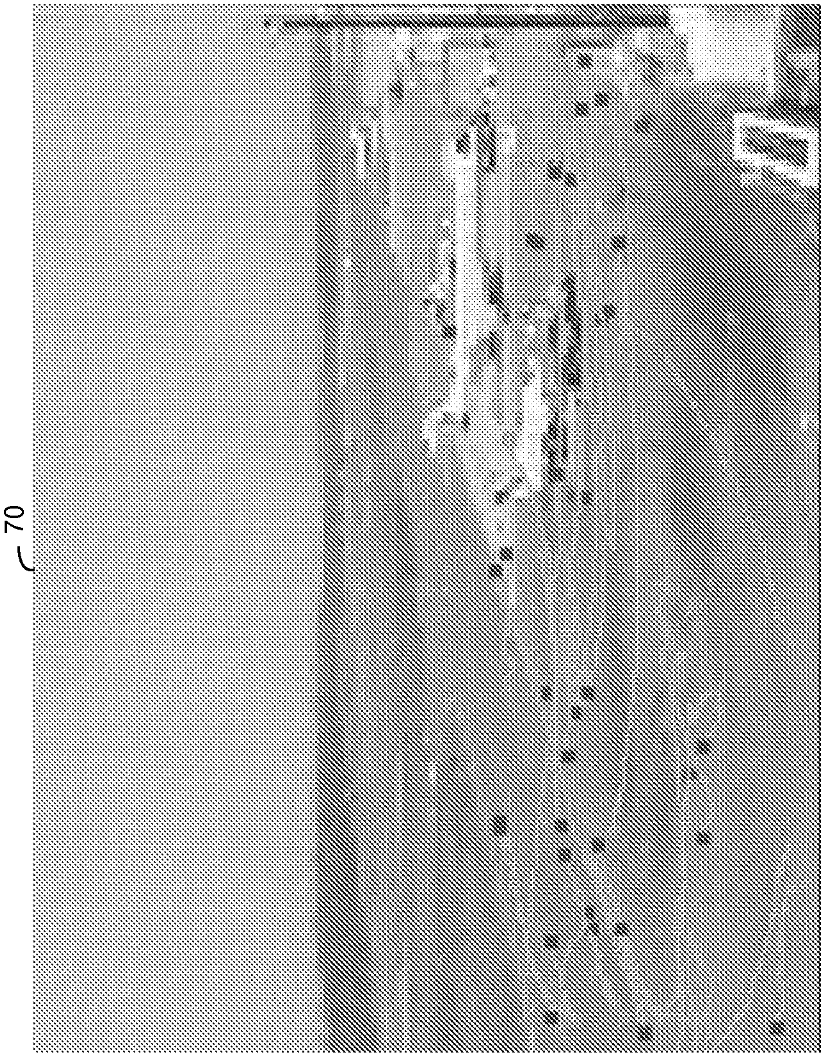
FIG. 10 shows an illustrative image of a portion of an airport with training object tracking data displayed thereon according to an embodiment.
Figure 11:
FIG. 11 shows an illustrative image of the portion of the airport shown in FIG. 10 with prototypical tracks displayed thereon according to an embodiment.

It is understood that monitoring an entrance of a building or other area where pedestrians are frequently present is only an illustrative implementation of computer system 20. To this extent, FIG. 10 shows an illustrative image 70 of a portion of an airport with training object tracking data displayed thereon, and FIG. 11 shows an illustrative image 72 of the same portion of the airport with prototypical tracks displayed thereon according to an embodiment. Computer system 20 can evaluate the training object tracking data shown in image 70 to generate the prototypical tracks. As illustrated, computer system 20 detects several terminal regions and typical trajectories there between based on the traffic shown in image 70. Some of the terminal regions are not located adjacent to an edge of the image, and may have resulted from an object moving behind a plane before reappearing on the other side.

While abnormal behavior is primarily shown and described as an object moving in a manner that does not follow a prototypical track, it is understood that this is only illustrative of the abnormal behavior that computer system 20 can detect. For example, computer system 20 can detect abnormal behavior that is attributable to an object moving too fast or slow/stopping. In this case, training and monitoring object tracking data 42, 44 can include an estimate of the speed in which the object is moving. An average speed and standard deviation can be stored as part of the prototypical track. Additionally, computer system 20 can compare an estimated speed with a minimum/maximum allowed speed to determine the presence of abnormal behavior. Further, computer system 20 can detect abnormal behavior based on an object that is too large for the location, an object detected at a restricted time, an object traveling the wrong direction, and/or the like. In each case, computer system 20 can determine and store as part of region schema 40 data on the size of objects detected in a location, the times that objects appear in a location (and/or a rule designating time(s) that no objects are allowed in the location), the direction objects travel, and/or the like.

Further, in addition to determining abnormal behavior, computer system 20 can use region schema 40 to ignore noise in the monitored area, which is frequently responsible for errors in determining the abnormal behavior. For example, computer system 20 can identify the locations of moving trees, flashing lights, and/or the like, which can be stored in region schema 40. Further, computer system 20 can identify regular behavior of objects, such as how shadows are cast, regular movement (e.g., gates/doors opening/closing, water surface ripples/reflections, and/or the like), which can be stored in region schema 40. Computer system 20 can subsequently use this information in determining abnormal behavior using any solution.

In an embodiment, computer system 20 processes image data received from multiple cameras 14. In this case, computer system 20 can use training object tracking data 42 that is generated for each camera 14 during the same initialization time period to generate a region schema for each camera 14. Further, computer system 20 can determine object(s) that are imaged by two or more cameras 14, correlate terminal regions identified in images acquired by different cameras 14, and/or the like. Further, while monitoring the area(s), computer system 20 can predict object appearance/behavior in the image data received from one camera 14 based on the tracking data generated for the object in another camera 14. For example, a vehicle may move through the area monitored by a first camera 14, and based on speed and direction, computer system 20 can predict when the vehicle should enter the area monitored by a second camera 14 that is located further down a road.

Further, when a camera 14 can be moved by user 12, computer system 20 can process training object tracking data 42 that is received over multiple initialization time periods. For each initialization time period, camera 14 can be adjusted to capture image data for a different view. Computer system 20 can generate a separate region schema 40 for each view, and subsequently combine the region schemas 40 to create a single region schema 40 for camera 14. For example, computer system 20 can correlate the locations of object(s) that appear in multiple views, correlate terminal regions and/or prototypical tracks located in different views, and/or the like. In an embodiment, camera 14 acquires image data at its widest field of view for each of the initialization time periods, and computer system 20 adjusts the locations of the prototypical tracks when camera 14 is zoomed in (e.g., based on zoom signals).

While shown and described herein as generating region schema 40, training object tracking data 42, and monitored object tracking data 44, computer system 20 can obtain some or all of the data 40, 42, 44 using any solution. For example, computer system 20 can retrieve some or all of the data 40, 42, 44 from one or more data stores, receive some or all of the data 40, 42, 44 from another system, and/or the like. To this extent, some or all of the functionality described herein as being implemented and performed by computer system 20 can be implemented and performed apart from computer system 20.

While shown and described herein as a method and system for monitoring an area, it is understood that aspects of the invention further provide various alternative embodiments. For example, in one embodiment, the invention provides a computer program embodied in at least one computer-readable medium, which when executed, enables a computer system to monitor an area. To this extent, the computer-readable medium includes program code, such as monitoring program 30 (FIG. 1), which implements some or all of a process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; paper; and/or the like. Further, a copy of the program code can be transitory, e.g., embodied in a modulated data signal having one or more of its characteristics set and/or changed in such a manner as to encode information in the signal.

In another embodiment, the invention provides a method of providing a copy of program code, such as monitoring program 30 (FIG. 1), which implements some or all of a process described herein. In this case, a computer system can generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program embodied in at least one computer-readable medium. In either case, the set of data signals can be transmitted/received using any type of communications link.

In still another embodiment, the invention provides a method of generating a system for monitoring an area. In this case, a computer system, such as computer system 20 (FIG. 1), can be obtained (e.g., created, maintained, made available, etc.) and one or more modules for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing and/or I/O devices to the computer system; and (3) incorporating and/or modifying the computer system to enable it to perform a process described herein.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of monitoring an area, the method comprising:

generating a region schema for the area, the generating including:

obtaining training object tracking data for the area for an initialization time period;

evaluating the object tracking data to identify a set of prototypical tracks, each prototypical track including a start location, an end location, and a trajectory, the trajectory comprising an expected path an object will travel between the start location and the end location, and each prototypical track including variation information for the trajectory, the variation information defining a plurality of crossbars, comprising a plurality of lines that intersect a line formed by the trajectory at a substantially perpendicular angle, the plurality of crossbars being periodically located along the trajectory; and storing the set of prototypical tracks in the region schema;

obtaining monitored object tracking data for a monitored object in the area after the initialization time period;

identifying abnormal behavior of the monitored object when the monitored object tracking data for the monitored object does not follow at least one of the set of prototypical tracks in the region schema; and determining whether the object tracking data for the monitored object varies too far from each prototypical track using the variation information, wherein the monitored object trajectory must pass through each of the set of crossbars to follow the prototypical track.

2. The method of claim 1, wherein the variation information defines a set of typical modes of variation from the trajectory, and wherein the monitored object must vary from the trajectory in one of the set of typical modes of variation to follow the prototypical track.

3. The method of claim 1, the obtaining training object tracking data including generating a training object track for each of a plurality of moving objects in the area during the initialization time period.

4. The method of claim 3, wherein the evaluating includes:

identifying a start point and an end point for each training object track;

clustering the start points and the end points to identify a set of terminal regions in the area;

assigning each training object track to one of a plurality of classes based on the start point and the end point for the training object track and the set of terminal regions; and clustering the set of training object tracks for at least one of the plurality of classes to generate a prototypical track for the at least one of the plurality of classes.

5. The method of claim 1, further comprising generating an alert for presentation to a user in response to the abnormal behavior.

6. A system for monitoring an area, the system comprising:

a component configured to obtain a region schema for the area, the region schema including a set of prototypical tracks, each prototypical track including a start location, an end location, and a trajectory, the trajectory comprising an expected path an object will travel between the start location and the end location, and each prototypical track including variation information for the trajectory, the variation information defining a plurality of crossbars, comprising a plurality of lines that intersect a line formed by the trajectory at a substantially perpendicular angle, the plurality of crossbars being periodically located along the trajectory;

a component configured to obtain monitored object tracking data for a monitored object in the area;

a component configured to identify abnormal behavior of the monitored object when the monitored object tracking data for the monitored object does not follow at least one of the set of prototypical tracks in the region schema; and the component configured to identify further being configured to determine whether the object tracking data for the monitored object varies too far from each prototypical track using the variation information, wherein the monitored object trajectory must pass through each of the set of crossbars to follow the prototypical track.

7. The system of claim 6, wherein the component configured to obtain the region schema is configured to generate the region schema by obtaining training object tracking data for the area for an initialization time period, evaluating the object tracking data to identify the set of prototypical tracks, and storing the set of prototypical tracks in the region schema.

8. The system of claim 7, the obtaining training object tracking data including generating a training object track for each of a plurality of moving objects in the area during the initialization time period.

9. The system of claim 8, wherein the evaluating includes:

identifying a start point and an end point for each training object track;

clustering the start points and the end points to identify a set of terminal regions in the area;

assigning each training object track to one of a plurality of classes based on the start point and the end point for the training object track and the set of terminal regions; and clustering the set of training object tracks for at least one of the plurality of classes to generate a prototypical track for the at least one of the plurality of classes.

10. The system of claim 6, further comprising a component configured to generate an alert for presentation to a user in response to the abnormal behavior.

11. A computer program comprising program code embodied in at least one non-transitory computer-readable medium, which when executed, enables a computer system to implement a method, the method comprising:

generating a region schema for an area, the generating including:

obtaining training object tracking data for the area for an initialization time period;

evaluating the object tracking data to identify a set of prototypical tracks, each prototypical track including a start location, an end location, and a trajectory, the trajectory comprising an expected path an object will travel between the start location and the end location, and each prototypical track including variation information for the trajectory, the variation information defining a plurality of crossbars, comprising a plurality of lines that intersect a line formed by the trajectory at a substantially perpendicular angle, the plurality of crossbars being periodically located along the trajectory; and storing the set of prototypical tracks in the region schema; and storing the region schema on a computer-readable medium.

12. The computer program of claim 11, the method further comprising:

obtaining monitored object tracking data for a monitored object in the area after the initialization time period;

identifying abnormal behavior of the monitored object when the monitored object tracking data for the monitored object does not follow at least one of the set of prototypical tracks in the region schema; and determining whether the object tracking data for the monitored object varies too far from each prototypical track using the variation information, wherein the monitored object trajectory must pass through each of the set of crossbars to follow the prototypical track.

13. The computer program of claim 12, the method further comprising generating an alert for presentation to a user in response to the abnormal behavior.

14. The computer program of claim 11, the obtaining training object tracking data including generating a training object track for each of a plurality of moving objects in the area during the initialization time period.

15. The computer program of claim 14, wherein the evaluating includes:

identifying a start point and an end point for each training object track;

clustering the start points and the end points to identify a set of terminal regions in the area;

assigning each training object track to one of a plurality of classes based on the start point and the end point for the training object track and the set of terminal regions; and clustering the set of training object tracks for at least one of the plurality of classes to generate a prototypical track for the at least one of the plurality of classes.

16. A method of generating a system for monitoring an area, the method comprising providing a computer system operable to:

generate a region schema for the area, the generating including:

obtaining training object tracking data for the area for an initialization time period;

evaluating the object tracking data to identify a set of prototypical tracks, each prototypical track including a start location, an end location, and a trajectory, the trajectory comprising an expected path an object will travel between the start location and the end location, and each prototypical track including variation information for the trajectory, the variation information defining a plurality of crossbars, comprising a plurality of lines that intersect a line formed by the trajectory at a substantially perpendicular angle, the plurality of crossbars being periodically located along the trajectory; and storing the set of prototypical tracks in the region schema;

obtain monitored object tracking data for a monitored object in the area after the initialization time period;

identify abnormal behavior of the monitored object when the monitored object tracking data for the monitored object does not follow at least one of the set of prototypical tracks in the region schema; and determining whether the object tracking data for the monitored object varies too far from each prototypical track using the variation information, wherein the monitored object trajectory must pass through each of the set of crossbars to follow the prototypical track.

* * * * *